United States Patent [19]
Schindler et al.

[11] 3,896,960
[45] July 29, 1975

[54] ELECTRICAL JUNCTION BOX FOR EXISTING WALL CONSTRUCTIONS

[75] Inventors: Edgar C. Schindler, Seattle; John C. McEachron, Tacoma, both of Wash.

[73] Assignee: Nelco Corporation, Orting, Wash.

[22] Filed: Aug. 23, 1971

[21] Appl. No.: 174,065

[52] U.S. Cl. ................. 220/3.5; 174/48; 174/53; 220/266
[51] Int. Cl. ............................................. H02g 3/08
[58] Field of Search ............ 220/3.5, 3.3, 3.6, 3.94, 220/3.92, 3.2; 174/53, 58, 48, 49

[56] References Cited
UNITED STATES PATENTS

| | | | |
|---|---|---|---|
| 1,869,646 | 8/1932 | Anderson | 220/3.8 |
| 1,943,001 | 1/1934 | Clayton | 174/58 |
| 1,971,908 | 8/1934 | Fullman | 220/3.94 |
| 2,959,633 | 11/1960 | Palmer et al. | 174/53 |
| 3,053,013 | 9/1962 | Fork | 220/3.4 |
| 3,622,029 | 11/1971 | Ware | 220/3.94 |

Primary Examiner—William I. Price
Assistant Examiner—Stephen Marcus
Attorney, Agent, or Firm—Harold J. Rathbun; Ernest S. Kettelson

[57] ABSTRACT

The box is adapted to be inserted for mounting through an opening in the front panel of a wall that has a rear panel spaced from the front panel, where the width of the opening and the wall panel spacing are materially less than the width of the box. The front of the box includes a closed area portion adjacent to one side, and an adjoining open area portion affording frontal access to the interior of the box, located between the opposite side and said closed area portion. Moreover, the opposite side is shaped to form a chamfered relief corner enabling the box to be swung about an axis at the box front intermediate said one side and opposite side, for clearing a side edge of the front wall panel opening, during sidewise insertion of the box through said wall opening. After insertion, the box is mounted with its front open area portion in registry with the wall opening, and its closed area portion offset laterally from such wall opening behind the front panel.

21 Claims, 6 Drawing Figures

PATENTED JUL 29 1975　　　　　　　　　3,896,960

INVENTORS,
EDGAR C. SCHINDLER
JOHN C. McEACHRON
BY
Christensen & Sanborn
ATTORNEYS

ELECTRICAL JUNCTION BOX FOR EXISTING WALL CONSTRUCTIONS

THE INVENTION IN GENERAL

The invention relates to electrical junction boxes such as those which are employed in mounting and housing electrical devices such as outlets and switches; and more particularly, to boxes of this nature which are employed in mounting and housing such devices in narrow cavity wall constructions and/or existing wall constructions, such as in decorative partitioning, remodeling work, and/or the fitting out of travel trailers and other mobile homes.

One object of the invention is to provide an electrical junction box of this nature which can be installed in those narrow cavity wall constructions which will not accommodate code-conforming boxes of conventional depth. Another object is to provide a box of this nature which can be installed in existing narrow cavity wall constructions, such as those for which the only access to the cavity is through the opening normally provided for exposing the box to use, such as the opening normally provided for the switch or outlet to be mounted. A further object is to provide a box of this nature which can be secured to the wall construction after it is installed in the cavity thereof through the same opening by which it is thereafter exposed to use, notwithstanding that the box may fill the opening when installed. Other objects include the provision of a box of this nature which can be prewired, or at least prethreaded with wire, before it is inserted and installed in the wall construction. Still further objects will become apparent from the description of the invention which follows hereafter.

According to the invention, these and other objects are realized by an electrical junction box, the wall structure of which has a front, back and sides joined together to form a chamber within the box, there being an opening to the chamber in the front of the box whose centerline is offset from the centerline of the front, so that the opening is disposed adjacent one side of the box, and a portion of the chamber is enclosed behind the front of the box, adjacent the other side thereof. The relatively back portion of the wall which joins the back with the front on the one side of the box, is sloped in chamfered relief relative to points adjacent the front of the box between the other side and the centerline of the opening in the front, so that the box can be inserted sidewise through an aperture in a panel, with the other side advancing first, and swung into a position in which the other side is disposed behind the panel, laterally of the aperture, and the opening in the box is substantially registered with the aperture, for mounting of an electrical device therein.

For example, the back portion may be sloped in relationship to points on a curvilinear line; and may be sloped in relationship to points on an axis adjacent the front of the box between the other side and the centerline of the opening.

In presently preferred embodiments of the invention, the relatively front portion of the wall joining the back with the front on the one side of the box, is substantially perpendicular to the front of the box. The back portion converges inwardly toward the other side of the box over substantially a major portion of the depth of the box. Moreover, the wall converges inwardly toward the other side of the box so as to join the back at a point opposite the opening. The opening is defined in part by the wall, and has a rim thereabout which is exteriorly outstanding from the front of the box. The portion of the chamber adjacent the other side opens into the portion thereof adjacent the one side of the box. The box also comprises means adapting the box so that it can be fixed behind the panel in the position described.

BRIEF DESCRIPTION OF THE DRAWING:

These features will be better understood by reference to the accompanying drawing which illustrates a preferred vertically oriented version of the box, and the manner of its installation in an existing narrow cavity wall construction.

In the drawing.

Figure 1:
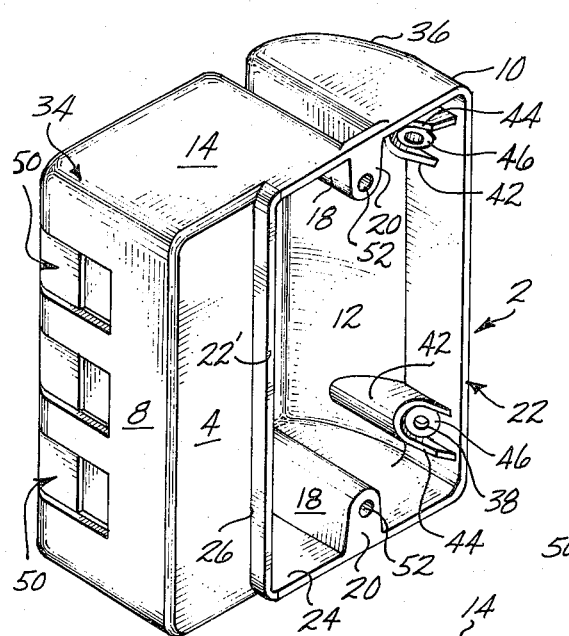
FIG. 1 is a perspective view of the box.
Figure 2:
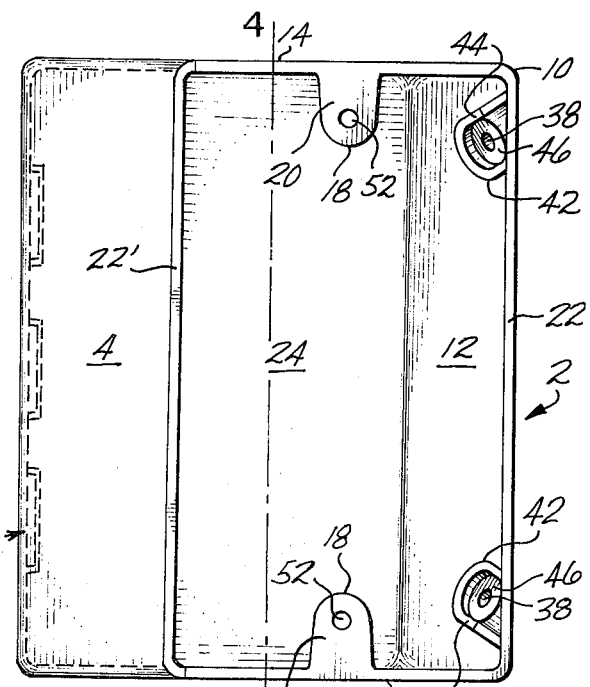
FIG. 2 is a front elevational view of the same.
Figure 3:
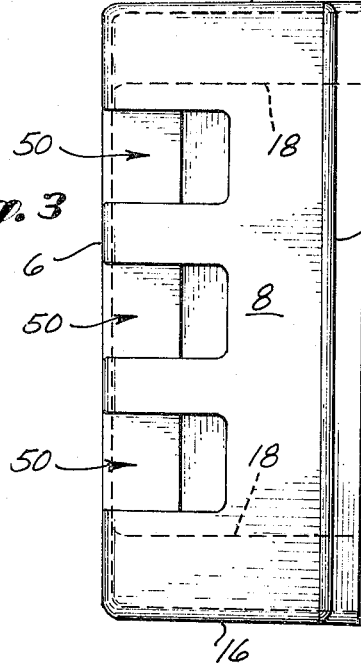
FIG. 3 is a left side elevational view.
Figure 4:
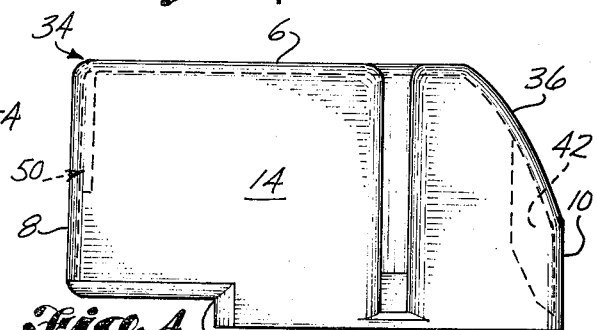
FIG. 4 is a top plan view.

DESCRIPTION OF THE PREFERRED EMBODIMENT:

Referring now to the drawing, it will be seen that the embodiment takes the form of a molded plastic box 2 having upstanding front and back or top and bottom walls 4 and 6, which are spaced apart in parallel relationship to one another and joined along the corresponding upright end edge portions thereof by a pair of upstanding left and right or end side walls 8 and 10 therebetween which are orthogonally disposed to the front and back walls 4 and 6, and which together with the front and back walls define a chamber 12 within the box. The chamber 12 is closed at the sides thereof by a pair of horizontal side walls 14 and 16 which are inwardly embossed in a front to rear vertical plane of the box that is offset from the vertical center line 4-4 of the front or top wall 4. The embossments 18 form vaulted, oppositely disposed rib walls in the chamber, whose front end faces 20 are coplanar with the rim 22 of an opening 24 to the chamber 12 in the front or top wall 4 of the box. The vertical center line of the opening 24 coincides with the plane of the embossments 18; and the rim 22 of the opening is exteriorly outstanding from the front or top wall 4 of the box in coincidence with the side walls 14, 16, and end wall 10 of the box, on the top, bottom and right-hand sides thereof, there being a right angular outside corner 26 formed between the left-hand side 22' of the rim and the front or top wall 4 of the box.

Though the box 2 meets Code requirements as to volume, the front and back or top and bottom walls 4 and 6 of the same are spaced apart at a dimension tending to give the box a parallelepipedal configuration which is prolate in the side-to-side sense thereof. Thus the box 2 is well adapted to be received in the hollow or cavity 28 of a wall 30 in which the opposing panels or facing members are separated by perhaps only two or three inch studding material. Because of the offset condition of the opening 24, the box is also well adapted to the task of being installed in an existing wall construction, such as that in FIGS. 5 and 6 where the opening 32 in the same for exposing the box to use is disposed adjacent one member 33 of the studding. In such a case, the right angular outside corner 26 between the front or top wall 4 of the box and the rim 22 of the opening, provides a handy fulcrum line whereby the box can be introduced into the opening 32 of the wall as shown, by inserting the left-hand side wall portion or "lanai" 34 of the box, first, and then swinging the box into the installed position in registry with the opening, as in FIG. 6. For this purpose, moreover, the right-hand back corner 36 of the box converges inwardly toward the left-hand side wall 8 of the box to the extent necessary to enable the box to be swung into position, as for example, by providing it with a contour which is rounded about an axis coinciding with the left-hand rim portion 22' of the opening in the box.

Figure 5:
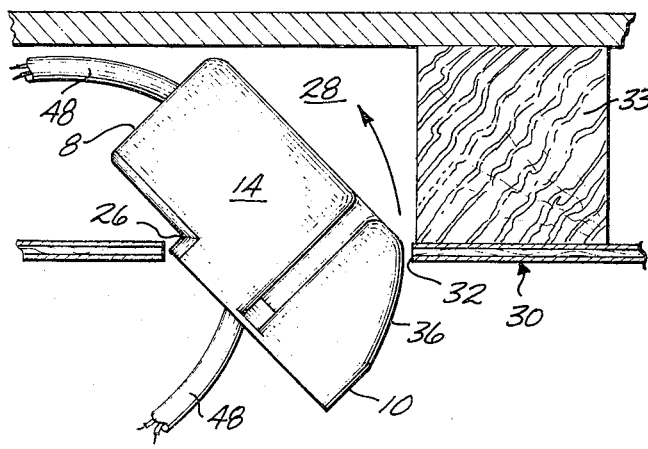
FIG. 5 is a part cross-sectional installational view.
Figure 6:
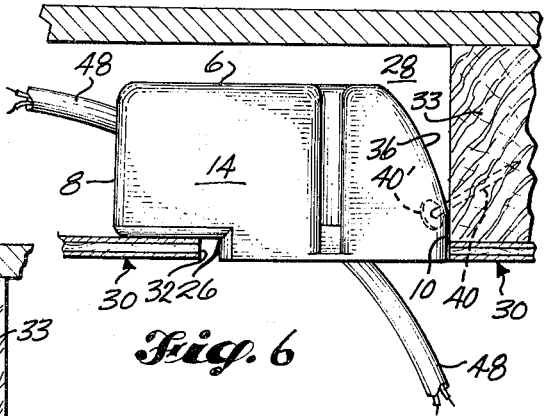
FIG. 6 is a similar view after the box is installed.

The front mounting procedure of FIGS. 5 and 6 is also made possible by the provision of means such as openings 38 in the chamber, which are accessible through the front wall opening 24 of the box, to enable it to be fastened to the wall construction 30, as for example, at the studding 33 adjacent the right-hand end wall 10 of the box when it is installed in the wall. The openings 38 are disposed in the right-hand end wall 10 of the box, and in this instance, adjacent the back corner 36 thereof; and for ease of installation, take the form of elongated guideways 38 for mechanical fasteners such as nails 40, which are driven into the studding 33. The guideways 38 are canted to one another along lines passing outwardly through the opening 24 in the front or top wall 4 of the box, and are defined by embossments 42 on the right-hand end wall 10 of the box, the open end surfaces 44 of which are countersunk about the guideways 38 to form recesses 46 for receiving the flanged heads 40' of the nails, screws or other fasteners. In this way, the fasteners 40 can be recessed flush with the surfaces 44 of the embossments, to avoid any chance that the electrical wiring 48 in the box might snag or otherwise catch thereon.

The wiring 48 is threaded into the box through one of a plurality of pry-open, frangible knockouts 50 in the left-hand end wall 8 of the box. These knockouts 50 are of the same type disclosed in our copending application Ser. No. 69,266, filed Sept. 3, 1970, and entitled "Molded Electrical Junction Box." Preferably, the necessary number of knockouts is opened, and the wiring is threaded into the box through the same, before the box is swiveled into position within the cavity of the wall. Thereafter, when the box is securely fastened in place, the appropriate device (not shown) is added, the wiring connections are made, and the box is covered by a plate (not shown) in conventional fashion, there being apertures 52 in the front end faces 20 of the rib walls 18 for receiving the screws of the cover.

What is claimed is:

1. A wall-mounting electrical outlet box which can be inserted for mounting through an opening in the front panel of a wall that has a rear panel spaced from the front panel, where the width of the opening and the wall panel spacing are materially less than the width of the box, said box comprising a back, enclosing sides joined to and projecting forwardly from said back, and a front which includes a closed area portion adjacent one side and an adjoining open area portion affording frontal access to the interior of said box located between the opposite side and said closed area portion, said opposite side converging inwardly toward the first side over substantially a major portion of the depth of the box to join the back, such inward convergence reducing the width of the box at the back by an amount of the same order of magnitude as the extent of said depth major portion and forming a chamfered relief corner enabling the box to be swung about an axis at the box front intermediate said one side and opposite side for clearing a side edge of the front wall panel opening during sidewise insertion of the box through said wall opening, and means adapting the box for mounting the same with its front open area portion in registry with such a wall opening and its closed area portion offset laterally from such wall opening behind the front panel.

2. The box defined in claim 1 wherein the open area portion of the box front immediately adjoins said opposite side.

3. The box defined in claim 1 wherein the slope of said opposite side follows a convex curve.

4. The box defined in claim 1 wherein the front open area portion of the box is at least partially surrounded by a rim which projects forwardly from the closed front portion of the box.

5. An electrical junction box, the wall structure of which has a front, back, and sides joined together to form a chamber within the box, there being an opening to the chamber in the front of the box whose center line is offset from the center line of the front, so that the opening is disposed adjacent one side of the box, and a portion of the chamber is enclosed behind the front of the box, adjacent the other side thereof, and the relatively back portion of the wall which joins the back with the front on the one side of the box, being sloped in chamfered relief relative to points adjacent the front of the box between the other side and the center line of the opening in the front, so that the box can be inserted sidewise through an aperture in a panel, with the other side advancing first, and swung into a position in which the other side is disposed behind the panel, laterally of the aperture, and the opening in the box is substantially registered with the aperture, for mounting of an electrical device therein.

6. The electrical junction box according to claim 5 wherein the back portion is sloped in relationship to points on a curvilinear line.

7. The electrical junction box according to claim 5 wherein the back portion is sloped in relationship to points on an axis adjacent the front of the box between the other side and the center line of the opening.

8. The electrical junction box according to claim 5 wherein the relatively front portion of the wall joining the back with the front on the one side of the box, is substantially perpendicular to the front of the box.

9. The electrical junction box according to claim 5 wherein the back portion converges inwardly toward the other side of the box over substantially a major portion of the depth of the box.

10. The electrical junction box according to claim 5 wherein the wall joining the back with the front on the one side of the box, converges inwardly toward the other side of the box so as to join the back at a point opposite the opening.

11. The electrical jucntion box according to claim 5 wherein the opening is defined in part by the wall joining the back with the front on the one side of the box.

12. The electrical junction box according to claim 5 wherein the opening has a rim thereabout which is exteriorly outstanding from the front of the box.

13. The electrical junction box according to claim 5 wherein the portion of the chamber adjacent the other side opens into the portion thereof adjacent the one side of the box.

14. The electrical junction box according to claim 5 further comprising means adapting the box so that it can be fixed behind the panel in the position described.

15. An electrical outlet box structure of the type described adapted to be assembled through an opening of predetermined width in a wall panel or the like, comprising means providing a first box portion having opposite side walls, first and second end walls and a bottom wall, said side and end walls having upper margins defining an opening opposite from said bottom wall, and means providing a second box portion joined with and extending laterally from said first box portion in a direction opposite from said first end wall, said second box portion being in open communication with said first box portion and including a top wall offset inwardly from said upper margins, said first end wall including portions thereof shaped and directed generally away from the opening defined by the upper margins of said side and end walls and extending generally toward said second box portion and joining said bottom wall along marginal edge thereof, such that the distance from any point on said first end wall and those points on said second end wall and the top wall of said second box portion engageable with the wall panel during assembly, is not greater than the width of said wall panel opening for avoiding interference with an edge of the opening in said wall panel during insertion of the box structure through said last-mentioned opening.

16. An electrical outlet box structure as defined in claim 15, wherein said first end wall portions are curved.

17. An electrical outlet box structure as defined in claim 15 which includes a one-piece main box member providing said side walls, said first end wall and said bottom wall of said first box portion, and also providing said second box portion with side walls, a bottom wall and an end wall opposite said first end wall of the first box portion.

18. An electrical outlet box structure as defined in claim 15, wherein said second box portion further includes a bottom wall portion, side walls, and an end wall disposed oppositely of the first end wall of said first box portion and closing an end of said box structure, said second box portion being joined directly to said first box portion at the second end wall of said first box portion through an opening which provides the aforesaid open communication between said box portions, said last-mentioned opening corresponding to the interior cross-sectional dimensions of the second box portion and being defined by the top, bottom and side walls of said second box portion.

19. An electrical outlet box structure as defined in claim 15, further including knockout structure formed in at least one of the walls of said box structure.

20. In an electrical installation wherein an electrical outlet box structure of the type described is assembled through an opening of predetermined width in a wall panel, an outlet box structure comprising means providing a first box portion having opposite side walls, first and second end walls and a bottom wall, said side and end walls having upper margins defining an opening opposite side bottom wall, and means providing a second box portion joined with and extending laterally from said first box portion in a direction opposite from said first end wall, said second box portion being joined directly to said second end wall of the first box portion and an open communication with said first box portion through the second end wall of said first box portion, said second box portion including a bottom wall, side walls and end wall opposite said first end wall of the first box portion and closing an end of said box structure, and top wall offset inwardly from said upper margins, said first end wall including portions thereof shaped and directed away from the opening defined by said upper margins, and extending generally towards said second box portion and joining said bottom wall along a marginal edge thereof, such that the distance from any point on said first end wall portion and those points on said second end wall and the top wall of said second box portion engagable with the wall panel during assembly, is not greater than the width of said wall panel opening for avoiding interference with an edge of an opening in said wall panel during insertion of the box structure through said last-mentioned opening.

21. In an electrical installation as defined in claim 20, wherein said outlet box structure being formed with the bottom walls of the first and second box portions connected in a coplanar relationship, and the respective side walls of said first and second box portions also joined in a coplanar relationship.

* * * * *